US011881112B1

(12) United States Patent
Canavor et al.

(10) Patent No.: US 11,881,112 B1
(45) Date of Patent: Jan. 23, 2024

(54) ANNOTATED VIRTUAL TRACK TO INFORM AUTONOMOUS VEHICLE CONTROL

(71) Applicant: Amazon Technologies, Inc., Seattle, WA (US)

(72) Inventors: Darren Ernest Canavor, Redmond, WA (US); Charles Edward Cartwright, Seattle, WA (US); Gur Kimchi, Bellevue, WA (US); Brandon William Porter, Yarrow Point, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/806,642

(22) Filed: Jun. 13, 2022

Related U.S. Application Data

(63) Continuation of application No. 16/796,149, filed on Feb. 20, 2020, now Pat. No. 11,380,203, which is a
(Continued)

(51) Int. Cl.
*G08G 1/16* (2006.01)
*G08G 1/123* (2006.01)
(Continued)

(52) U.S. Cl.
CPC ........... *G08G 1/164* (2013.01); *G05D 1/0206* (2013.01); *G05D 1/0212* (2013.01);
(Continued)

(58) Field of Classification Search
CPC .......... G08G 1/164; H04W 4/02; H04W 4/40; H04W 4/44; H04W 4/70; G05D 1/0112;
(Continued)

(56) References Cited

U.S. PATENT DOCUMENTS 7,844,835 B2    11/2010    Ginter et al.
9,043,130 B2    5/2015    Ricci
(Continued)

FOREIGN PATENT DOCUMENTS

CA    2739989 A1 *    4/2010    .......... G01S 17/023
CA    2809689 A1    9/2014
(Continued)

OTHER PUBLICATIONS

Office Action for U.S. Appl. No. 16/796,149, dated Nov. 10, 2021, Canavor, "Annotated Virtual Track To Inform Autonomous Vehicle Control", 13 pages.
(Continued)

*Primary Examiner* — Atul Trivedi
(74) *Attorney, Agent, or Firm* — Lee & Hayes, P.C.

(57) ABSTRACT

Recent location and control information received from "lead" vehicles that traveled over a segment of land, sea, or air is captured to inform, via aggregated data, subsequent "trailing" vehicles that travel over that same segment of land, sea, or air. The aggregated data may provide the trailing vehicles with annotated road information that identifies obstacles. In some embodiments, at least some sensor control data may be provided to the subsequent vehicles to assist those vehicles in identifying the obstacles and/or performing other tasks. Besides, obstacles, the location and control information may enable determining areas traveled by vehicles that are not included in conventional maps, as well as vehicle actions associated with particular locations, such as places where vehicles park or make other maneuvers.

20 Claims, 10 Drawing Sheets

Related U.S. Application Data continuation of application No. 15/912,401, filed on Mar. 5, 2018, now Pat. No. 10,614,716, which is a continuation of application No. 15/194,385, filed on Jun. 27, 2016, now Pat. No. 9,953,535.

(51) Int. Cl.

| | | |
|---|---|---|
| *H04W 4/40* | (2018.01) | |
| *G05D 1/02* | (2020.01) | |
| *H04W 4/70* | (2018.01) | |
| *G05D 1/10* | (2006.01) | |
| *H04W 4/44* | (2018.01) | |
| *G08G 1/01* | (2006.01) | |
| *H04W 4/02* | (2018.01) | |
| *G08G 1/0967* | (2006.01) | |

(52) U.S. Cl.
CPC ......... *G05D 1/0289* (2013.01); *G05D 1/101* (2013.01); *G08G 1/0112* (2013.01); *G08G 1/0133* (2013.01); *G08G 1/0141* (2013.01); *G08G 1/09675* (2013.01); *G08G 1/096716* (2013.01); *G08G 1/096725* (2013.01); *G08G 1/096741* (2013.01); *G08G 1/096775* (2013.01); *G08G 1/123* (2013.01); *G08G 1/165* (2013.01); *G08G 1/166* (2013.01); *G08G 1/167* (2013.01); *H04W 4/02* (2013.01); *H04W 4/40* (2018.02); *H04W 4/44* (2018.02); *H04W 4/70* (2018.02)

(58) Field of Classification Search
CPC .. G05D 1/0133; G05D 1/0141; G05D 1/0206; G05D 1/0212; G05D 1/0289; G05D 1/096716; G05D 1/096725; G05D 1/096741; G05D 1/09675; G05D 1/096775; G05D 1/101; G05D 1/123; G05D 1/165; G05D 1/166; G05D 1/167
USPC ......................................................... 701/301
See application file for complete search history.

(56) References Cited

U.S. PATENT DOCUMENTS

| | | | |
|---|---|---|---|
| 9,216,745 B2 * | 12/2015 | Beardsley | ........ G08G 1/096816 |
| 9,665,100 B2 | 5/2017 | Shashua et al. | |
| 9,690,293 B2 | 6/2017 | Shashua et al. | |
| 9,696,719 B2 | 7/2017 | Aviel | |
| 10,020,987 B2 | 7/2018 | Donovan et al. | |
| 10,136,284 B2 | 11/2018 | Palanisamy et al. | |
| 10,139,834 B2 | 11/2018 | Bai et al. | |
| 10,223,911 B2 | 3/2019 | Modi et al. | |
| 10,268,891 B2 | 4/2019 | Calman et al. | |
| 10,275,959 B2 | 4/2019 | Ricci | |
| 10,277,519 B2 | 4/2019 | Brandt et al. | |
| 11,441,916 B1 * | 9/2022 | Konrardy | ................ H04W 4/40 |
| 2006/0187017 A1 | 8/2006 | Kulesz et al. | |
| 2010/0106356 A1 | 4/2010 | Trepagnier et al. | |
| 2012/0237083 A1 | 9/2012 | Lange et al. | |
| 2014/0009275 A1 | 1/2014 | Bowers et al. | |
| 2014/0009307 A1 | 1/2014 | Bowers et al. | |
| 2014/0136414 A1 * | 5/2014 | Abhyanker | .......... G05D 1/0011 701/25 |
| 2015/0061895 A1 | 3/2015 | Ricci | |
| 2015/0112504 A1 | 4/2015 | Binion et al. | |
| 2015/0112730 A1 | 4/2015 | Binion et al. | |
| 2015/0112731 A1 | 4/2015 | Binion et al. | |
| 2015/0119081 A1 | 4/2015 | Ayoob et al. | |
| 2015/0178998 A1 | 6/2015 | Attard et al. | |
| 2015/0202770 A1 | 7/2015 | Patron et al. | |
| 2015/0241993 A1 | 8/2015 | Gallo et al. | |
| 2015/0246672 A1 * | 9/2015 | Pilutti | ................... B60W 30/00 701/2 |
| 2015/0266509 A1 | 9/2015 | Ignaczak et al. | |
| 2015/0284010 A1 * | 10/2015 | Beardsley | ........ G08G 1/096816 701/1 |
| 2015/0294422 A1 | 10/2015 | Carver et al. | |
| 2015/0337587 A1 * | 11/2015 | Lu | ...................... G01C 21/3438 701/49 |
| 2015/0338226 A1 | 11/2015 | Mason et al. | |
| 2015/0346718 A1 * | 12/2015 | Stenneth | .............. G05D 1/0282 701/2 |
| 2015/0346727 A1 | 12/2015 | Ramanujam | |
| 2015/0382084 A1 | 12/2015 | Gallo et al. | |
| 2016/0171521 A1 | 6/2016 | Ramirez et al. | |
| 2017/0010106 A1 | 1/2017 | Shashua et al. | |
| 2017/0010614 A1 | 1/2017 | Shashua et al. | |
| 2017/0090480 A1 | 3/2017 | Ho et al. | |
| 2017/0248960 A1 | 8/2017 | Shashua et al. | |
| 2018/0154902 A1 * | 6/2018 | Shami | ..................... G01S 19/13 |
| 2018/0184242 A1 | 6/2018 | Jones | |
| 2019/0102730 A1 | 4/2019 | Giorgi et al. | |
| 2019/0137595 A1 | 5/2019 | Choi et al. | |
| 2019/0161190 A1 | 5/2019 | Gil et al. | |
| 2019/0291728 A1 | 9/2019 | Shalev-Shwartz et al. | |
| 2020/0207384 A1 | 7/2020 | Dick et al. | |
| 2021/0366289 A1 * | 11/2021 | Salles | ...................... G08G 1/20 |
| 2022/0343137 A1 * | 10/2022 | Surendran | .............. G06N 3/063 |
| 2022/0396289 A1 * | 12/2022 | Li | ........................ G05D 1/0088 |

FOREIGN PATENT DOCUMENTS

| | | | | |
|---|---|---|---|---|
| CA | 2947995 A1 * | 11/2015 | ............. | B60K 28/02 |
| CA | 3067177 A1 * | 8/2016 | ............. | B60W 30/10 |
| CA | 3120270 A1 * | 12/2021 | ............. | G05D 1/0022 |
| CN | 104859649 A * | 8/2015 | ............. | B60W 30/12 |
| EP | 1600351 A1 | 11/2005 | | |
| GB | 2523908 A * | 9/2015 | ............. | B60W 30/00 |
| KR | 102181651 B1 * | 11/2020 | ............. | B60W 30/12 |
| WO | WO2016033796 A1 | 3/2016 | | |

OTHER PUBLICATIONS

Office Action for U.S. Appl. No. 15/912,401, dated Jun. 13, 2019, Canavor, "Annotated Virtual Track To Inform Autonomous Vehicle Control", 11 pages.

Office Action for U.S. Appl. No. 15/194,385, dated Aug. 8, 2017, Canavor, "Annotated Virtual Track To Inform Autonomous Vehicle Control", 10 pages.

Strava Labs, "Strava Global Heatmap," accessed on Jun. 14, 2016 at <<http://labs.strava.com/heatmap>>, 1 page.

\* cited by examiner

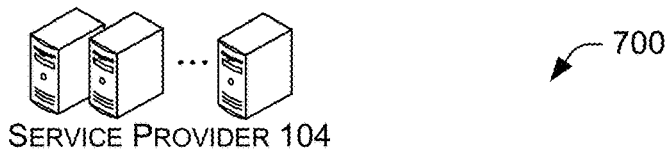

```
┌──────────────────────────────────────┐
│   ANALYZE VIRTUAL TRACK DATA 702     │
└──────────────────────────────────────┘
                  │
                  ▼
┌──────────────────────────────────────┐
│ DETERMINE PRESENCE OF OBSTACLES FROM │
│        VIRTUAL TRACK DATA 704        │
└──────────────────────────────────────┘
                  │
                  ▼
┌──────────────────────────────────────┐
│         LABEL OBSTACLES 706          │
└──────────────────────────────────────┘
                  │
                  ▼
┌──────────────────────────────────────┐
│ ASSOCIATE PARAMETERS WITH OBSTACLES 708 │
└──────────────────────────────────────┘
                  │
                  ▼
┌──────────────────────────────────────┐
│ ANNOTATE VIRTUAL TRACK DATA WITH     │
│         ANNOTATIONS 710              │
└──────────────────────────────────────┘
                  │
                  ▼
┌──────────────────────────────────────┐
│ DETERMINE SENSOR CONTROL DATA TO     │
│ ENABLE A VEHICLE TO MONITOR          │
│ OBSTACLES ALONG SEGMENT 712          │
└──────────────────────────────────────┘
                  │
                  ▼
┌──────────────────────────────────────┐
│ SEND SENSOR CONTROL DATA TO VEHICLES │
│ FOR FUTURE USE TO IDENTIFY AND AVOID │
│ OBSTACLES 714                        │
└──────────────────────────────────────┘
```

FIG. 7

ANNOTATED VIRTUAL TRACK TO INFORM AUTONOMOUS VEHICLE CONTROL

CROSS REFERENCE TO RELATED APPLICATIONS AND PRIORITY CLAIMS

This application is a continuation of and claims priority to U.S. application Ser. No. 16/796,149 filed on Feb. 20, 2020 and entitled "Annotated Virtual Track to Inform Autonomous Vehicle Control," which is a continuation of and claims priority to U.S. application Ser. No. 15/912,401, filed on Mar. 5, 2018 and entitled "Annotated Virtual Track to Inform Autonomous Vehicle Control," issued as U.S. Pat. No. 10,614,716, which is a continuation of and claims priority to U.S. application Ser. No. 15/194,385 filed on Jun. 27, 2016 and entitled "Annotated Virtual Track to Inform Autonomous Vehicle Control," issued as U.S. Pat. No. 9,953,535, the entirety of which are incorporated herein by reference.

BACKGROUND

Typically, a map is created by observing physical features in an environment and then drawing at least some of those physical features on the map. Maps may also be created using satellite photography, aerial photography, and/or other imaging that may identify at least some of the physical features of a physical area. Maps may be supplemented by additional data, such as text, markers, symbols, different layers, and/or other information, which may enable a user to extract specific information from the map.

Today, many maps are created in digital form for use by computing devices. These maps may include interactive data and/or may be readily updated to show changes traffic speed. However, the underlying road shown in the maps is infrequently updated. In addition, the map is often a simplified version of a road that only represents the road as having a lane.

Autonomous vehicles are often guided by map data as well as sensor data received from sensors onboard the autonomous vehicles. The autonomous vehicles are often disconnected from or unable to communicate, either directly or indirectly with other vehicles, such as to share large amounts of information other than indications of traffic speed, which is often overlaid with the map data. For example, when a typical autonomous vehicle navigates a road, the autonomous vehicle may align its location with a road from map data.

The autonomous vehicle may control the vehicle in response to signals generated by sensors onboard the autonomous vehicle, such as imaging sensors, proximity sensors, distance sensors, and/or other types of sensors. The controls may include steering inputs, acceleration/deceleration inputs, and other types of control inputs. As an example of sensor use, the autonomous vehicle may determine lane information by analyzing visual imagery captured by the onboard sensors. The autonomous vehicle may then make lane change decisions based on this self-collected lane information. The autonomous vehicle may also detect obstacles, such as stalled car, pedestrians, and/or other obstacles using the onboard sensors, which may process the information locally to generate control signals that control actions to avoid the obstacles. However, when the autonomous vehicle relies solely or primarily on self-detection of the surrounding environment, the autonomous vehicle must process large amounts of data in real-time, and may be subject to false-positive detections of obstacles, which may cause the autonomous vehicle to take undesirable actions. Further, the autonomous vehicles may not optimize use of the onboard sensors, such as by concentrating the sensors to collect data from areas known to be associated with previous obstacles, since the controller of the sensors is generally unaware of any areas known to be associated with previous obstacles.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 7 is a flow diagram of an illustrative process to identify obstacles from aggregated sensor data received from vehicle use.

DETAILED DESCRIPTION

Figure 1:
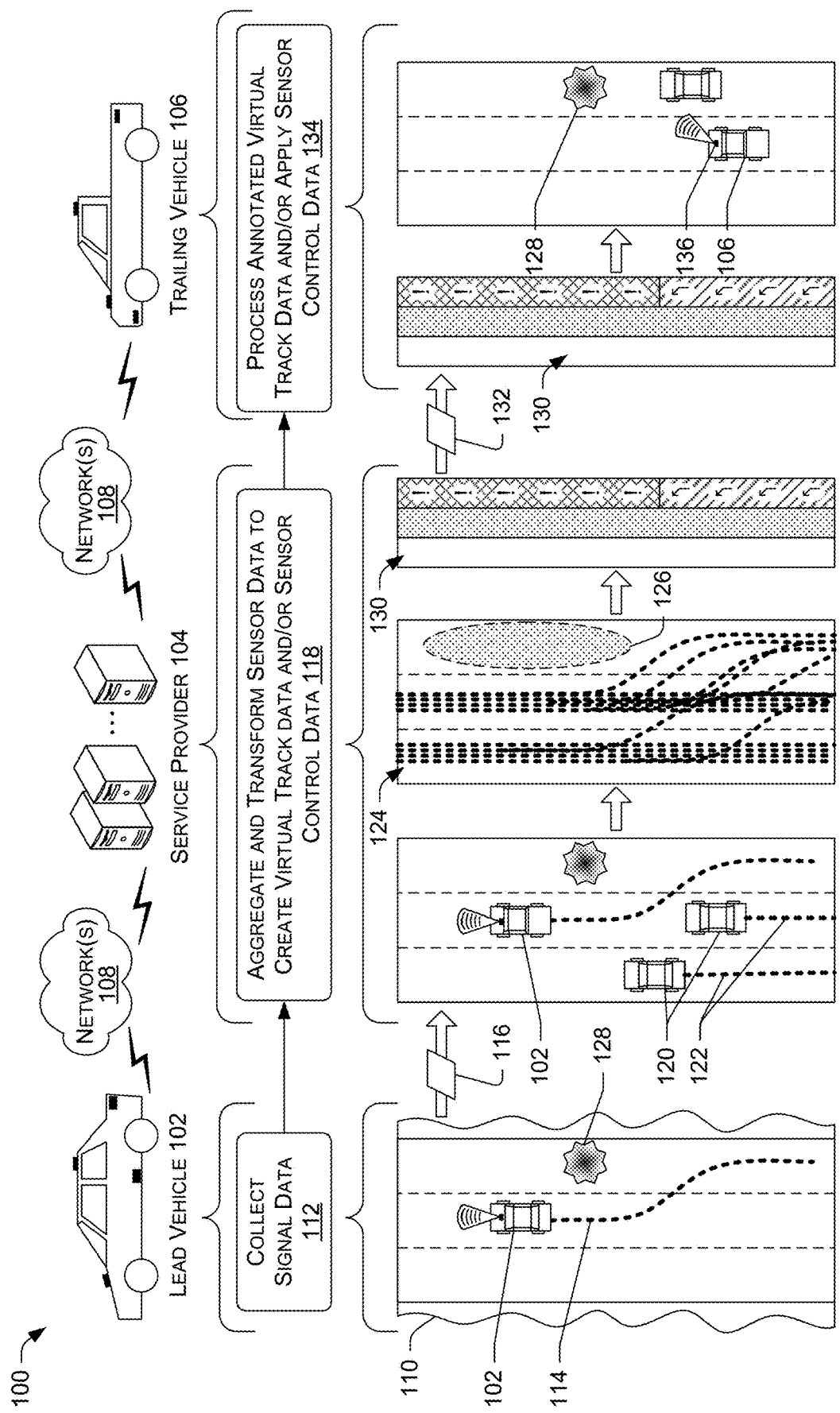
FIG. 1 is a pictorial flow diagram of an illustrative process to create an annotated virtual track to inform autonomous vehicle control.

This disclosure is directed to capturing recent location and control information from "lead" vehicles that traveled over a segment of land, sea, or air to inform subsequent "trailing" vehicles that travel over that same segment. The trailing vehicles may be independent from and not associated with the lead vehicles, and thus may not operate as a convoy or in other similar coordinated operations. The time between the travel of the lead vehicles and trailing vehicles over the same terrain may be seconds, minutes, hours, or even days. The control information may provide the trailing vehicles with annotated road information that identifies hazards, obstacles and/or other features not found in conventional maps. The hazards may be conditions, objects, or things that may distract a person, cause harm to a vehicle, and/or cause harm to another object on or near the vehicle. The obstacles may include items blocking part of a roadway, objects or people that may be near the roadway, activity of vehicles on the roadway (e.g., slow moving, erratic behavior, high level of braking, high variation in speed, etc.), and/or any other types of obstacles that may compromise an ability of the trailing vehicles to successfully travel through the segment.

Additionally, while embodiments described herein may relate to land-based vehicles (e.g., cars and trucks), it should be understood that embodiments described herein and claimed may also relate to automated aerial (e.g., airplanes, helicopters, unmanned aerial vehicles, etc.) and marine vehicles (e.g., submarines and ships) that may be traveling in "air lanes" or "sea lanes" (or a combination of land, air, and sea lanes) to their desired destinations. In some embodiments, at least some sensor control data may be provided to the trailing vehicles to assist those vehicles in monitoring the obstacles and/or performing other tasks. Besides, obstacles, the location and control information may enable determining areas traveled by vehicles that are not included in conventional maps, as well as vehicle actions associated with particular locations, such as places where vehicles park (and for how long), places to successfully make U-turns, and/or other information not included in conventional maps.

The location and control information from "lead" vehicles, may be aggregated and augmented by each subsequent vehicle passing to create a virtual track, which may be used to form a detailed map of paths traveled by vehicles. The location and control information, when aggregated, may be used to annotate the virtual track. For example, aggregated location information may reveal that a roadway has three lanes that travel in a same direction. The information, during a period of time, may also show that one lane has not been traversed by a vehicle in a relatively long period of time. This information may be used to determine that an obstacle exists along this lane. The virtual track may then be annotated to indicate an obstacle in that lane for an amount of time. The annotation may be modified or removed after later information shows vehicles passing through that portion of the lane again. Besides location information, control information may reveal presence of obstacles. For example, rapid deceleration and/or irregular steering inputs may be used for creation of annotations that indicate a dangerous or high-alert area, which may then be processed by the trailing vehicle to cause the trailing vehicle to travel slower through the segment and/or increase a spacing from other vehicles proximate to the trailing vehicle, among other possible actions implemented by the trailing vehicle.

In some embodiments, a service provider may generate sensor control data from the aggregated virtual track information, which may be used to influence at least some control of sensors of the trailing vehicles. For example, the service provider may generate sensor control data to cause sensors to monitor areas identified as having or likely to have obstacles. Use of this data may better utilize some sensors, which otherwise may capture less valuable data.

In some embodiments, a trailing vehicle may access vehicle profile information, which may indicate performance parameters for the vehicle. The trailing vehicle may access user preference information associated with a passenger of the trailing vehicle, which may indicate a type of ride or comfort preference by the user or a group of users (e.g., slow, sport, casual, economy, minimized travel time, etc.). The trailing vehicle may determine controls using the virtual track data as well as the vehicle profile information and/or the user preference information to generate customized controls parameters used to control the vehicles. For example, the virtual track information may generate a suggested speed and vehicle spacing deemed appropriate for a segment of a path traveled by other vehicles. The trailing vehicle may modify the speed and vehicle spacing based on the vehicle profile information and/or the user preference information, such as to increase the speed and shorten the vehicle spacing distance when the vehicle profile information indicates a high performance vehicle (e.g., sports car) and the user preference information indicates a preference for minimized travel time. Of course, other types of adjustments are also possible using this data.

The techniques and systems described herein may be implemented in a number of ways. Example implementations are provided below with reference to the following figures.

FIG. 1 is a pictorial flow diagram of an illustrative process 100 to create an annotated virtual track to inform autonomous vehicle control. The process 100 is described with respect to a lead vehicle 102 that collects data, a service provider 104 that processes the data and data from other vehicles, and a trailing vehicle 106 that uses the processed data, each communicating data via one or more networks 108. The trailing vehicle 106 travels across a same segment of land 110 as the lead vehicle 102, but subsequent to the lead vehicle 102. The segment of land 110 may or may not be associated with mapped road data. Thus, the data from the lead vehicle 102 may be used to create a map of a road or other navigable portion of land. Although the description that follows discusses separate operations for the lead vehicle 102 and the trailing vehicle 106, a vehicle may perform operations of both vehicles, and possibly perform at least some of the operations concurrently.

At 112, the lead vehicle 102 may collect signal data while moving through the segment 110. For example, the lead vehicle 102 may obtain global positioning system (GPS) data that includes location and time data points that can be used to determine a virtual track 114 traveled by the lead vehicle 102 at a particular point in time. The lead vehicle 102 may also obtain other data such as image sensor data, control input data (e.g., steering data, acceleration data, braking data, etc.), and/or other sensor data. The lead vehicle may aggregate some of the data, such as to compress or otherwise make the data optimized for transmission to the service provider 104. The lead vehicle 102 may transmit the collected data 116, possibly in data packets, to the service provider 104 at different times, such at intervals, randomly, or at other times.

At 118, the service provider 104 may aggregate and transform signal data to create virtual track data and/or sensor control data. For example, the service provider 104 may collect other location data from other vehicles 120 to create other virtual tracks 122. The service provider 104 may also collect other sensor data from the other vehicles 120, such as other control input data. This data may be aggregated to create aggregated virtual track data 124 that represents a comprehensive view of locations traveled by vehicles during a period of time, assuming the period of time is large enough to include an adequate number of samples to provide significant variations. The service provider 104 may analyze the aggregated virtual track data 124 to identify an obstacle location 126 which may be associated with an obstacle 128. The obstacle 128 may be an object that blocks or impedes travel through a previously traveled area of land, may be associated with irregular vehicle control data (e.g., unusual braking or swerving trends, etc.), and/or otherwise may prevent a vehicle from traversing through a portion of the segment 110 of land. The obstacle location 126 may be determined by a lack of location data at the obstacle location 126 when location data is expected at the corresponding location and/or based on vehicle control signals, which may indicate consistent and irregular controls that cause vehicles to avoid the obstacle area 126 when the corresponding location was previously not avoided. The service provider 104 may infer the presence of the obstacle 128 in the obstacle area 126, possibly without knowing an exact object causing the obstacle. However, the object may be determined in some instances by trends in data and/or by receipt of other data (e.g., police reports, news data, etc.). The service provider 104 may generate annotations that describe attributes of the segment, such as presence of the obstacle 128, vehicle speed, vehicle control data, and/or other relevant data (e.g., places vehicles park, places vehicles turn or make other types of maneuvers, etc.), and so forth to supplement the aggregated virtual track data. The service provider 104 may create annotated virtual track data 130 that includes the aggregated virtual track data and the annotations. The service provider 104 may transmit data 132 to the trailing vehicle 106 and possibly other vehicles. The data 132 may include the annotated virtual track data 130 and/or other data, such as sensor control data that can be used by the trailing vehicle 106 to augment control of sensors of the trailing vehicle 106, such as to monitor activity associated with an obstacle. The annotated virtual track data, when implemented by the trailing vehicle 106 may reduce an occurrence of false positive obstacle detections and/or increase a likelihood that the trailing will successfully traverse the segment of land, sea, or air.

At 134, the trailing vehicle 106 may process the annotated virtual track data and/or apply the sensor control data. The trailing vehicle 106 may be an autonomous vehicle (i.e., a self-driving vehicle or a partially self-driving vehicle) that uses the annotated virtual track data as in input to generate controls to guide the trailing vehicle across the segment 110 of land. In some embodiments, the autonomous vehicle may be guided by a selected track from the aggregated virtual track data 124. The selected track may be an actual track created by a prior vehicle that traversed the segment, or it may be a median track, average track, or other calculated track that represents information from multiple prior tracks. Thus, the annotated virtual track data 130 may provide the selected track, possibly in addition to providing other information such as presence of obstacles.

In some embodiments, the operation 134 may include providing sensor control data to the trailing vehicle 106. The sensor control data may cause a sensor 136 of the trailing vehicle 106 to direct data collection toward the obstacle 128 determined via the aggregated virtual track data 124 and/or toward another vehicle or area near the obstacle 128.

In some embodiments, the operation 134 may include providing control data to a trailing, or leading, human operated, non-sensor equipped vehicle. The sensor control data captured by the sensor 136 may indicate that this vehicle is tracking toward the obstacle 128. The service provider 104 may push an alert to capable devices in the human operated, non-sensor equipped vehicle to alert the driver or for other reasons.

The service provider 104 may generate annotated virtual track data for many segments of land, sea, or air, which may result in highly detailed and comprehensive map data that is dynamically updated as new data is collected and older data is purged over time, such as by use of a decaying function. Illustrative computing architecture of the service provider 104 is described next, followed by illustrative computing architecture of vehicles, such as the lead vehicle 102 and/or the trailing vehicle 106.

Figure 2:
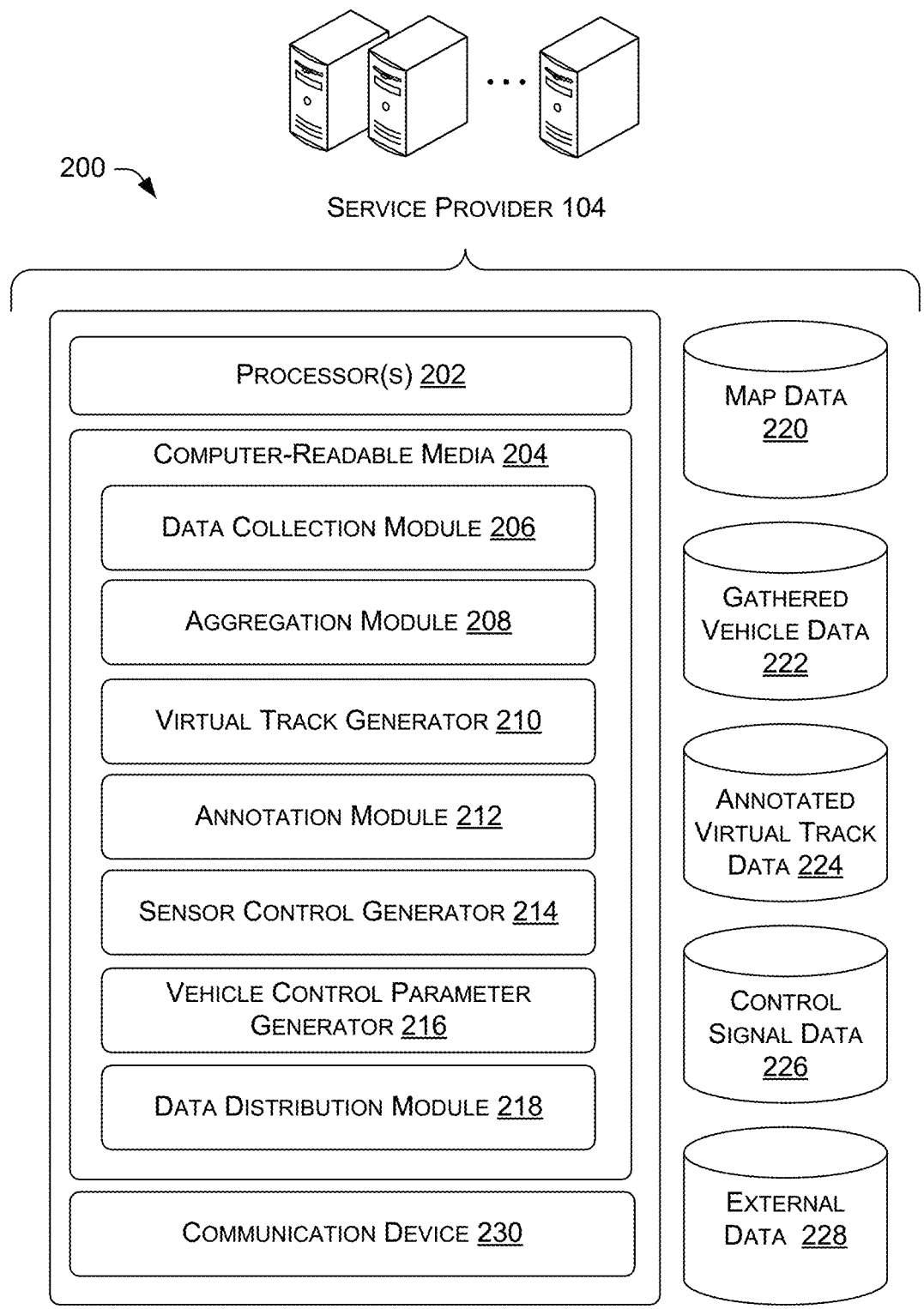
FIG. 2 is a block diagram of an illustrative computing architecture of the service provider shown in FIG. 1.

FIG. 2 is a block diagram of an illustrative computing architecture 200 of the service provider 104 shown in FIG. 1. The computing architecture 200 may be implemented in a distributed or non-distributed computing environment.

The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein for the service provider 104.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by a download.

In some embodiments, the computer-readable media 204 may store components including a data collection module 206, an aggregation module 208, a virtual track generator 210, an annotation module 212, a sensor control generator 214, a vehicle control parameter generator 216, and a data distribution module 218, which are described in turn. The service provider 104 may include or have access to various data sources, such as map data 220, gathered vehicle data 222, annotated virtual track data 224, control signal data 226, and third party data 228. The computing architecture 200 may also include a communication device 230 to enable the service provider to send and receive data. The components may be stored together or in a distributed arrangement.

The data collection module 206 may receive data from vehicles, such as the lead vehicle 102, via the communication device 228. For example, the data collection module 206 may obtain location data, vehicle control data, and/or other sensor generated data from various vehicles, which may be stored in the gathered vehicle data 222. The data collection module 206 may also collect other data, such as weather data, existing map data, vehicle profile data, user profile data, and/or other data to assist in creation of the annotated virtual track data and/or the vehicle control sensor data described herein, which is represented by the external data 228. The external data 228 may be, at least partly, maintained by other sources.

The aggregation module 208 may aggregate the virtual track data to create aggregated virtual track data. The aggregation module 208 may update the aggregated virtual track data continually or from time to time as new data is received from vehicles. The aggregation module 208 may apply a decay function to some data to cause at least some of the data to become less influential or be removed from use in the aggregated virtual track data. For example, data may be weighted, where the weights are lowered for older data to make the older data less influential. In some embodiments, the aggregation module 208 may identify some tracks as not being preferable for use in the aggregation, which may be designated as outlier data. For example, a track that resulted in a car being in a collision would be an obvious choice for exclusion as outlier data. The track data would reveal the collision since the vehicle associated with the track would have a period with no movement. When other operational data is associated with the track data, other tracks may be excluded for various reasons as outlier data. For example, a track that was created by a vehicle that engaged its antilock braking mechanism or traction control mechanism may be undesirable to include in the aggregated virtual track data. The aggregation module 208 may filter out or otherwise remove or refrain from incorporating tracks with attributes that are undesirable, including tracks where the vehicle appears to perform illegal maneuvers.

The virtual track generator 210 may create the virtual track data using the aggregated virtual track data. In some embodiments, the virtual track data may be used to create the map data 220, which may be similar to conventional map information, but more detailed and more currently reflective of roadways and other routes traveled by vehicles since the data is dynamically updated. However, the virtual track data may be used for other purposes, such as to assist autonomous vehicles to successfully navigate through a segment of land, sea, or air. The virtual track data may be stored in the annotated virtual track data 224. As discussed above, the virtual track data may indicate locations where vehicles have traveled during a specific period of time. The virtual track generator 210 may perform analytics on the aggregated virtual track data to determine time and/or days where statistical differences in the virtual tracks exists, and may group and/or classify the data accordingly. For example, the virtual track generator 210 may analyze data to determine that the direction of travel across a specific location changes during certain times of day. This may be due to the area being used for high occupancy vehicles (HOV) and changing direction based on a flow of rush hour traffic. The virtual track generator 210 may learn these trends and update and/or implement the virtual track data accordingly. As another example, the virtual track generator 210 may classify data based on different weather conditions and/or other variations. The virtual track generator 210 may determine routes traveled by vehicles other than roads, such as driveways, parking lots, and/or other routes.

The annotation module 212 may analyze the virtual track data to determine presence of obstacles and/or other vehicle control data to associate with the virtual track data as annotations. For example, the annotation module 212 may determine that an area has previously included location data from vehicles traveling across the area, but later has no occurrences of such vehicle presence. The annotation module 212 may determine that an obstacle is present at this area, and may possibly determine a time and/or a label for the obstacle. For example, the obstacle may be determined to be a stalled vehicle, road debris, construction equipment or road work (e.g., barriers, holes, metal plates, cones, etc.), and/or another specific type of obstacle. The annotation module 212 may determine other information from the virtual track data, such as locations where vehicles park, locations where vehicles perform specific maneuvers (e.g., U-turns, etc.), driveways or other routes that are not throughway roads, and/or other vehicle movement or position information. The annotation module 212 may associate the annotations with the virtual track data and store the annotations in the annotated virtual track data 224.

The sensor control generator 214 may determine sensor control data for distribution to the trailing vehicle, which may be used to augment operation of a sensor of the trailing vehicle to identify a known obstacle or other feature in the area being traveled by the trailing vehicle. The sensor control generator 214 may analyze the gathered vehicle data 222, which may include historical sensor data. This historical sensor data may provide indications of sensor data that is more important for successful control of a vehicle through a segment of land, sea, or air than other sensor data. The sensor control generator 214 may generate sensor control data to cause sensors to gather the more important sensor data, such as to be directed toward obstacles or vehicles that may be reacting to presence of the obstacles. The sensor control generator 214 may create sensor control data that is directed at known vehicle maneuvers, such as to detect U-turns and other control operations or maneuvers observed in the segment to enable earlier detection of reoccurring maneuvers. The sensor control generator 214 may package the control signal data for distribution to other vehicles.

The vehicle control parameter generator 216 may generate control parameters for vehicles, where the control parameters may be specific to segments of land, sea, or air and based on the gathered vehicle data and the annotated virtual track data. For example, the vehicle control parameters may include speed controls, acceleration controls (including deceleration), vehicle spacing controls, braking controls, steering controls, and/or other vehicle control inputs that may be used to control or augment control of an autonomous vehicle. The vehicle control parameters may include a range of acceptable values, such as a speed of 25-32 miles per hour, or a single value, which may be a maximum value, a minimum value, a mean value, or an average value. The control parameters may be modified by the trailing vehicle, such as by adjusting the control parameters or selecting from the control parameters based on further information, such as vehicle performance information and/or user preference data.

The data distribution module 218 may distribute the various data generated by the service provider 104 to the trailing vehicle 106 and/or other vehicles, or otherwise make the data available for use by such vehicles. For example, the data distribution module 218 may transmit data to a vehicle that is approaching a segment of land, sea, or air to enable the vehicle to access the control signal data, the annotated virtual track, and/or other data generated by the service provider 104 to enable the vehicle to successfully traverse the segment. In some embodiments, the data distribution module 218 may distribute the data to a central repository, which may be accessible by the vehicles via a data pull operation. Thus, the trailing vehicles may initiate a data request and pull to access data via the data distribution module 218 of the service provider 104.

The components of the service provider 104 are further described with reference to operations discussed below with reference to at least FIGS. 5-8.

Figure 3:
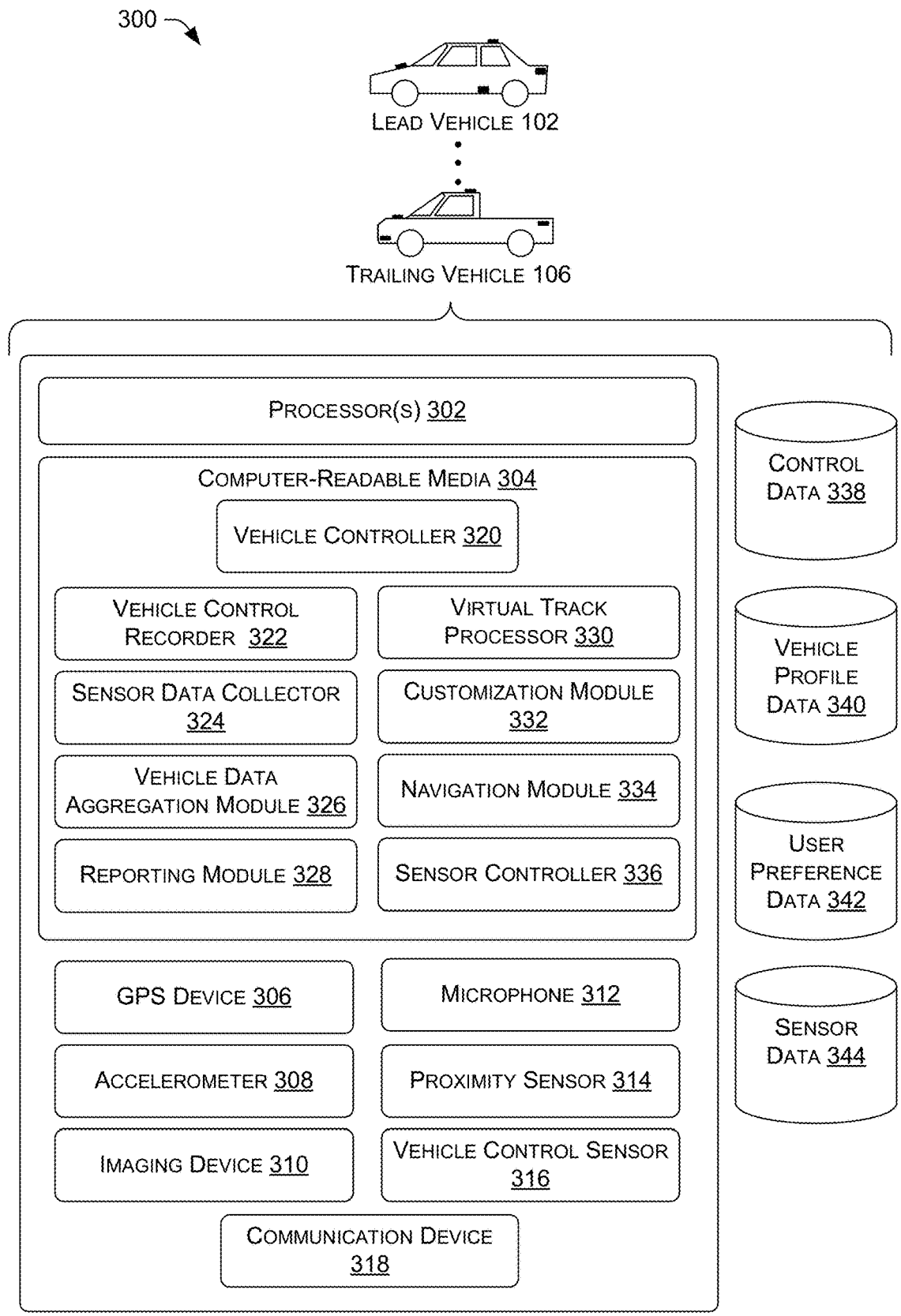
FIG. 3 is a block diagram of an illustrative computing architecture of the vehicles shown in FIG. 1.

FIG. 3 is a block diagram of an illustrative computing architecture 300 of the vehicles shown in FIG. 1, such as the lead vehicle 102 and/or the trailing vehicle 106. The computing architecture 300 may be implemented in a distributed or non-distributed computing environment.

The computing architecture 300 may include one or more processors 302 and one or more computer readable media 304 that stores various modules, applications, programs, or other data. The computer-readable media 304 may include instructions that, when executed by the one or more processors 302, cause the processors to perform the operations described herein for a vehicle, such as the lead vehicle 102, the trailing vehicle 106, or both.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by a download.

The vehicles may be equipped with various sensors to collect environmental data for use in controlling the vehicle. The sensors may include one or more of a GPS device 306, an accelerometer, 308, an imaging device 310 (e.g., a camera, etc.), a microphone 312, a proximity sensor 314, and/or a vehicle control tracker 316 to determine inputs to the vehicle control (e.g., steering inputs, braking inputs, acceleration inputs, etc.). The vehicles may also include a communication device 318 to exchange information with the service provider 104 and/or other entities.

In some embodiments, the computer-readable media 304 may store a vehicle control recorder 322, a sensor data collector 324, a vehicle data aggregation module 326, a reporting module 328, a virtual track processor 330, a customization module 332, a navigation module 334, and a sensor controller 336, which are described in turn. The components may be stored together or in a distributed arrangement. The vehicles may also have access to various data, such as control data 338, vehicle profile data 340, user preference data 342, and/or sensor data 344, which may be stored locally with the vehicle, accessed via the communication device 318, or both.

The vehicle controller 320 may provide controls to the vehicle, such as to provide autonomous controls or partially autonomous controls that may supplement controls provided by a human. The vehicle controller 320 may control steering inputs, braking inputs, acceleration (including deceleration), use of sensors, use of output devices and/or other devices (horn, speakers, lights, windshield wipers, etc.) and/or other actions of the vehicle. The vehicle controller 320 may utilize the annotated virtual track information for many different reasons and to provide many different improved results in operation of a vehicle, such as an autonomous vehicle. For example, the vehicle controller 320 may determine traffic signal patterns from the virtual track data, which may be used as control inputs to select acceleration and deceleration rates between traffic lights, such as to provide more efficient use of power supplies of the vehicle during travel. The vehicle controller 320 may use the annotated virtual track data to implement controls that include or integrate local driving customs, such as use of roadway shoulders during a turning maneuver, spacing of vehicles, use of horns, right of way to pedestrians, and so forth.

The vehicle control recorder 322, the sensor data collector 324, the vehicle data aggregation module 326, and the reporting module 328 may be used during data collection by the lead vehicle 102, or when a vehicle is collecting data in this role. These modules are described below.

The vehicle control recorder 322 may access the signals generated by the vehicle control sensor(s) 316 to determine control inputs by the vehicle. The vehicle control recorder 322 may record or store at least some of the signals output or operations performed by the vehicle controller 320. In some embodiments, the control inputs may include human interaction and may be steering controls, braking controls, acceleration (including deceleration), use of a horn, use of windshield wipers, and/or other control inputs. The vehicle control recorder 316 may selectively record or store indications of different inputs, which may be used by the annotation module and/or by other modules of the service provider 104 to supplement the annotated virtual track data and/or provide sensor control data. The vehicle control recorder 322 may store captured data in the control data 338.

The sensor data collector 324 may collect sensor data from the various sensors onboard the vehicle. The sensor data collector 324 may limit collection to certain samples of data and/or capture data out of typical range, such as anomaly sensor data (e.g., acceleration greater than a threshold, etc.) to reduce a volume of the sensor data collected and/or stored. The sensor data may be stored in the sensor data 344.

The vehicle data aggregation module 326 may aggregate data collected by the vehicle control recorder and/or the sensor data collector to enable distribution of the data to the service provider 104 for further processing. The aggregating may include compiling data for distribution in data packets at different times, such as to create packets of certain size and/or provide information within a certain amount of time after collection of data.

The reporting module 328 may report the data collected by the vehicle control recorder and/or the sensor data collector, and possibly aggregated by the vehicle data aggregation module 326, to the service provider 104. The reporting module 328 may cause the data to be sent at different times, such as based on an amount of data to be sent and/or a time associated with collection of the data.

The virtual track processor 330, the customization module 332, the navigation module 334, and the sensor controller 336 may be used during traversal of a segment of land, sea, or air by the trailing vehicle 106, or when a vehicle is utilizing processed data in this role.

The virtual track processor 330 may receive the annotated virtual track data from the service provider 104 and extract data for use to control operation of the vehicle during traversal across the segment of land, sea, or air. For example, the virtual track processor 330 may cause the vehicle controller 320 to control the vehicle along recently traveled tracks used by lead vehicles within a threshold amount of time (a certain number of seconds or minutes), assuming no obstacle has since been detected in the track. The track may be a lane of a multi-lane road (or airway or seaway). The virtual track processor 330 may augment other control data used by the vehicle controller 320, such as other sensor data collected by the vehicle, such as to inform vehicle decision making by the vehicle controller 320. As an example, the vehicle controller 320 may use the virtual track data from the virtual track processer until sensor data captured onboard the vehicle cause the vehicle controller to deviate from the virtual track data, such as to avoid another vehicle or for some other reason.

The customization module 332 may determine specific user preferences of passengers of the vehicle via the user preference data 322 and/or determine vehicle profile information from the vehicle profile data 340, which may be used by the customization module 332 to customize inputs to the vehicle controller 320 that controls the vehicle. The vehicle profile data 340 may include performance and feature information for the vehicle, such as braking capabilities, acceleration capabilities, and other attributes of the vehicle. The user preferences data may include user preferences for a type of ride, such as a preference for a type of transport as one of slow, sport, casual, economy, minimized travel time, and so forth. Other preferences may include minimize bumps, minimize braking, etc., which may be helpful if a passenger is trying to read, eat, or do work while in transit. The customization module 332 may modify or translate the virtual track data based on the preference data or vehicle profile data.

The navigation module 334 may process navigation of the vehicle, such as by determining routing information (e.g., general roads, etc.) to be used by the vehicle controller 320 to enable the vehicle to reach a destination. Thus, the navigation module 334 may process high level data from the virtual track data to determine how to get to a desired destination, whereas the vehicle controller 320 may perform low level operations to enable the vehicle to switch lanes, make turns, avoid obstacles and other vehicles, and otherwise successfully move through segments of land, sea, or air.

The sensor controller 336 may control operation of sensors onboard the vehicle. The sensor controller 336 may be informed in part by sensor control data provided by the service provider 104, which may augment operation of the sensor controller 336. The sensor controller 336 may determine frequency of sampling by the sensors, directionality of the sensors (when available to be modified), and/or other control features of the sensors. For example, the sensor controller 336 may direct a sensor to collect data in a direction of a predetermined obstacle to identify if the obstacle is present and/or to enable reaction to the obstacle or other objects (e.g., other vehicles), which may take avoidance action to avoid the obstacle, and possibly interfere with a route traveled by the vehicle.

The components of the vehicles are further described with reference to operations discussed below with reference to at least FIGS. 4, 9, and 10.

FIGS. 4-10 are flow diagrams illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
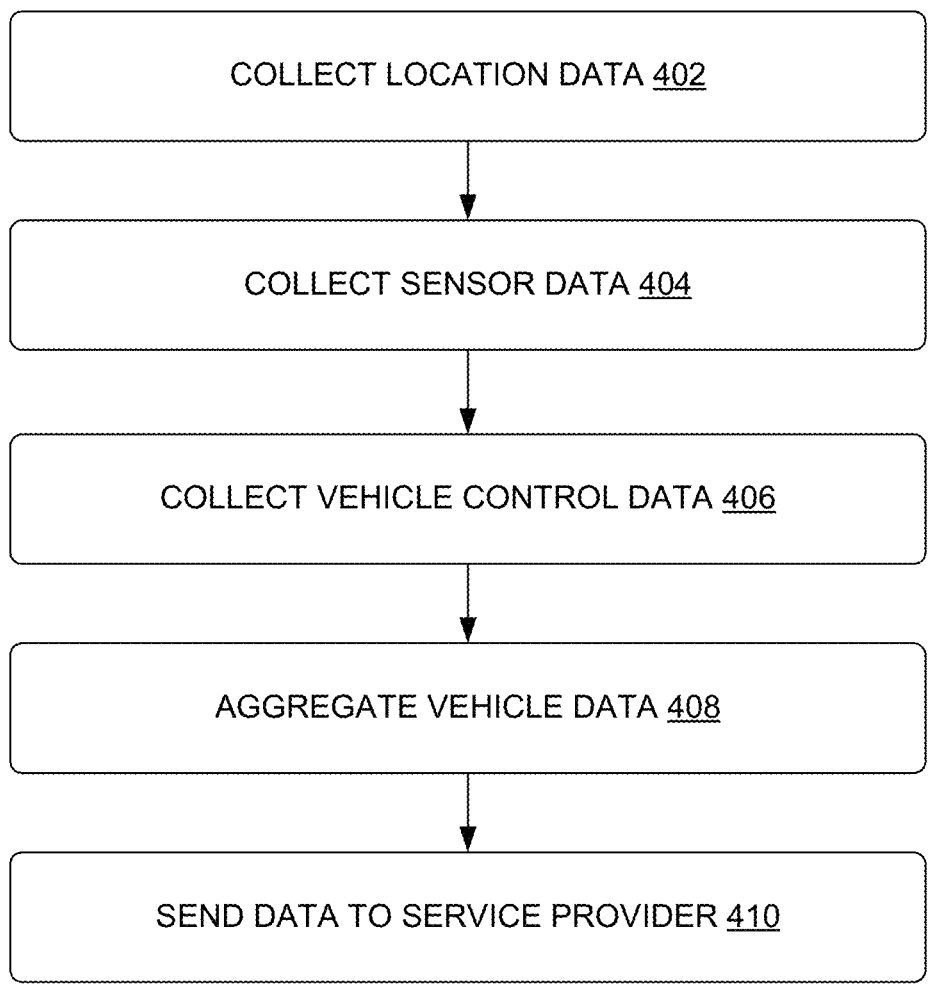
FIG. 4 is a flow diagram of an illustrative process to capture data by a lead vehicle to enable creation of annotated virtual track data.

FIG. 4 is a flow diagram of an illustrative process 400 to capture data by a lead vehicle to enable creation of annotated virtual track data. The process 400 is described with reference to the environment 100 and the computing architecture 300 and may be performed by a vehicle such as the lead vehicle 102.

At 402, the sensor data collector 324 may collect location data of a location of the lead vehicle 102. The location data may be GPS data collected by the GPS device 306. The location data may also include other location data that may supplement the GPS data, such as proximity sensor data in relation to another vehicle. For example, GPS data alone may not be accurately used to distinguish between travel along a left lane as compared to travel along a right lane of a roadway due to accuracy of the GPS data, which often has a variance of plus/minus about ten feet or more. However, proximity data may indicate that the vehicle has another vehicle traveling in the same direction that is located on the right side of the vehicle, which may enable determination that the lead vehicle 102 is traveling in the left lane and that the road has at least two lanes of travel in the same direction. Other useful inferences may be obtained from other sensor data to help construct the virtual track that accurately represents tracks followed by vehicles.

At 404, the sensor data collector 324 may collect other sensor data obtained by onboard sensors of the lead vehicle 102. The other sensor data may include image data, proximity data, acceleration (including deceleration) data, and so forth. The sensor data may also include sampling frequency and control information of the sensors (e.g., direction control, etc.).

At 406, the vehicle control recorder 322 may record operational control inputs of the vehicle. For example, the vehicle control recorder 322 may record or capture inputs or controls from the vehicle controller 320 and/or inputs received by a human driver, such as steering inputs, braking inputs, acceleration inputs, use of antilock braking mechanisms, use of traction control mechanisms, and so forth.

At 408, the vehicle data aggregation module 326 may aggregate at least some of the data collected at the operations 402, 404, and 406. The aggregation may consolidate data in preparation for sending the data to the service provider 104. In some embodiments, the vehicle data aggregation module 326 may aggregate data by performing transformation of the data, such as to transform location data points into an equation representing a curve or other segment. The vehicle data aggregation module 326 may aggregate data by representing some data as an average or mean value. For example, a speed traveled through a section may be represented as an average speed until a threshold change in speed is determined, such as in response to a braking control input.

At 410, the reporting module 328 may send the data collected at the operations 402, 404, and 406 and possibly aggregated at the operation 408 to the service provider 104 for further processing. The data may be transmitted in data packets, as a stream of data, and/or in response to triggers (e.g., data size, data collection time, etc.).

Figure 5:
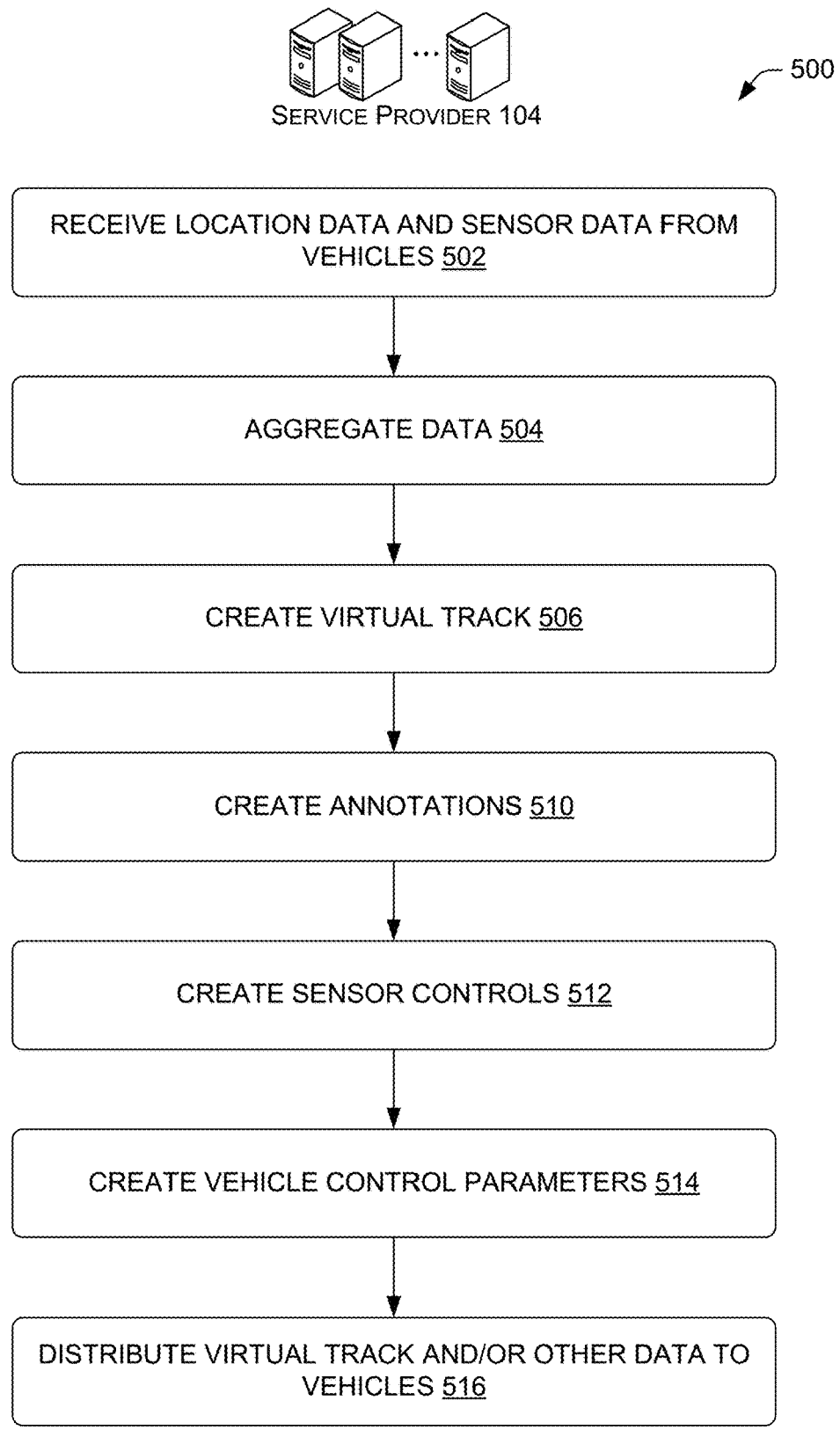
FIG. 5 is a flow diagram of an illustrative process to create annotated virtual track data and sensor control data from sensor data received from vehicle use.

FIG. 5 is a flow diagram of an illustrative process 500 to create annotated virtual track data and sensor control data from sensor data received from vehicle use. The process 500 is described with reference to the environment 100 and the computing architecture 200 and may be performed by the service provider 104.

At 502, the data collection module 206 may receive location data and other sensor data from the lead vehicle 102 and other vehicles that provide such data. The data received at the operation 502 may be the data generated at any of the operations 402-408 in the process 400 described above with reference to FIG. 4.

At 504, the aggregation module 208 may aggregate the data. For example, the aggregation module 208 may combine data and/or determine unique instances of data during a time period and in association with a segment of land, sea, or air. The aggregation module 208 may update the data continually as new data is received and/or from time to time. The aggregation module 208 may apply a decay function to some data to cause at least some of the data to become less influential or be removed from use over time.

At 506, the virtual track generator 210 may use the aggregated data to create virtual track data that includes paths or tracks traveled by vehicles over a segment of land, sea, or air during a period of time. In some embodiments, the virtual track generator 210 may create the map data 220, which may be similar to conventional map information, but more detailed and more reflective of current roadways and other routes traveled by vehicles since the data is dynamically updated. The virtual track generator 210 may perform analytics on the aggregated virtual track data to determine time and/or days where statistical differences in the virtual tracks exists, and may group and/or classify the data accordingly. For example, the virtual track generator 210 may analyze data to determine that the direction of travel across a specific location changes during certain times of day or is significantly different at different times of day. The virtual track generator 210 may learn trends and update and/or implement the virtual track data accordingly. The virtual track generator 210 may determine routes traveled by vehicles other than roads, such as driveways, parking lots, and/or other routes, which may be included in the virtual track. The virtual track generator 210 may identify tracks on areas that do not have corresponding traditional maps, such as routes commonly used across deserts or frozen lakes, as well as other places that lack standard or obvious roads.

At 510, the annotation module 212 may create annotations to associate with the virtual track. The annotation module 212 may analyze the virtual track data to determine presence of hazards, obstacles and/or other vehicle control data to associate with the virtual track data as annotations. For example, the annotation module 212 may determine presence of a hazard that may damage a vehicle, such as a rough road, icy conditions, nails on the road, etc. As another example, the annotation module 212 may determine presence of an obstacle that inhibits travel across a prior-traversed path in the segment of land, sea, or air. The annotation module 212 may create an annotation of the obstacle, which may include a label, such as a stalled vehicle, large road debris, construction, and/or another specific type of obstacle, when data permits determination of a label. The annotation module 212 may determine other information from the virtual track data, such as locations where vehicles park, locations where vehicles perform specific maneuvers (e.g., U-turns, etc.), driveways or other routes that are not through-way roads, and/or other vehicle movement or position information. The annotation module 212 may associate the annotations with the virtual track data and store the annotations in the annotated virtual track data 224.

At 512, the sensor control generator 214 may create sensor controls for use by vehicles that pass through a segment of land, sea, or air. The sensor control data may be used to augment operation of a sensor of the trailing vehicle to identify a known hazard, obstacle or other feature in the area being traveled by the trailing vehicle. The sensor control generator 214 may analyze the gathered vehicle data 222, which may include historical sensor data and/or sensor control data (e.g., when and/or how the sensors collected data). This historical sensor data may provide indications of sensor data that is of particular value for successful control of a vehicle through a segment of land, sea, or air. For example, when a vehicle is traveling in a left lane, sensor data collected from proximate the left side of the vehicle may have relatively little value since no lane of traffic exists there and therefore there is little chance of interaction with a vehicle from that direction which could not be detected by a forward facing center. However, data collection from the right side of the vehicle may be very important and value to prevent interference with another vehicle in an adjacent lane of traffic. The sensor control generator 214 may create sensor control data that is directed at known hazards, obstacles and or known vehicle maneuvers, such as to detect U-turns and other control operations observed in the segment to enable earlier detection of the hazards, obstacles or reoccurring maneuvers. The sensor control generator 214 may package the control signal data for distribution to other vehicles.

At 514, the vehicle control parameter generator 216 may create vehicle control parameters for use by the vehicle controller 320 to control operation of a vehicle through a segment of land, sea, or air. The vehicle control parameters may be specific to segments of land, sea, or air and based on the gathered vehicle data and/or the annotated virtual track data. For example, the vehicle control parameters may include speed controls, acceleration controls (including deceleration), vehicle spacing controls, steering controls, and/or other vehicle control inputs that may be used to control or augment control of an autonomous vehicle. The vehicle control parameters may include a range of acceptable values, such as a range of speed, or a single value, which may be a maximum value, a minimum value, a mean value, an average value, or another value.

At 516, the data distribution module 218 may distribute the various data generated by the service provider 104 at the operations 506-514 to the trailing vehicle 106 and/or other vehicles, or otherwise make the data available for use by such vehicles. For example, the data distribution module 218 may transmit data to a vehicle that is approaching a segment of land, sea, or air to enable the vehicle to access the control signal data, the annotated virtual track, and/or other data generated by the service provider 104 to enable the vehicle to successfully traverse the segment. In some embodiments, the data distribution module 218 may distribute the data to a central repository, which may be accessible by the vehicles via a data pull operation. Thus, the trailing vehicles may initiate a data request and pull to access data via the data distribution module 218 of the service provider 104.

Figure 6:
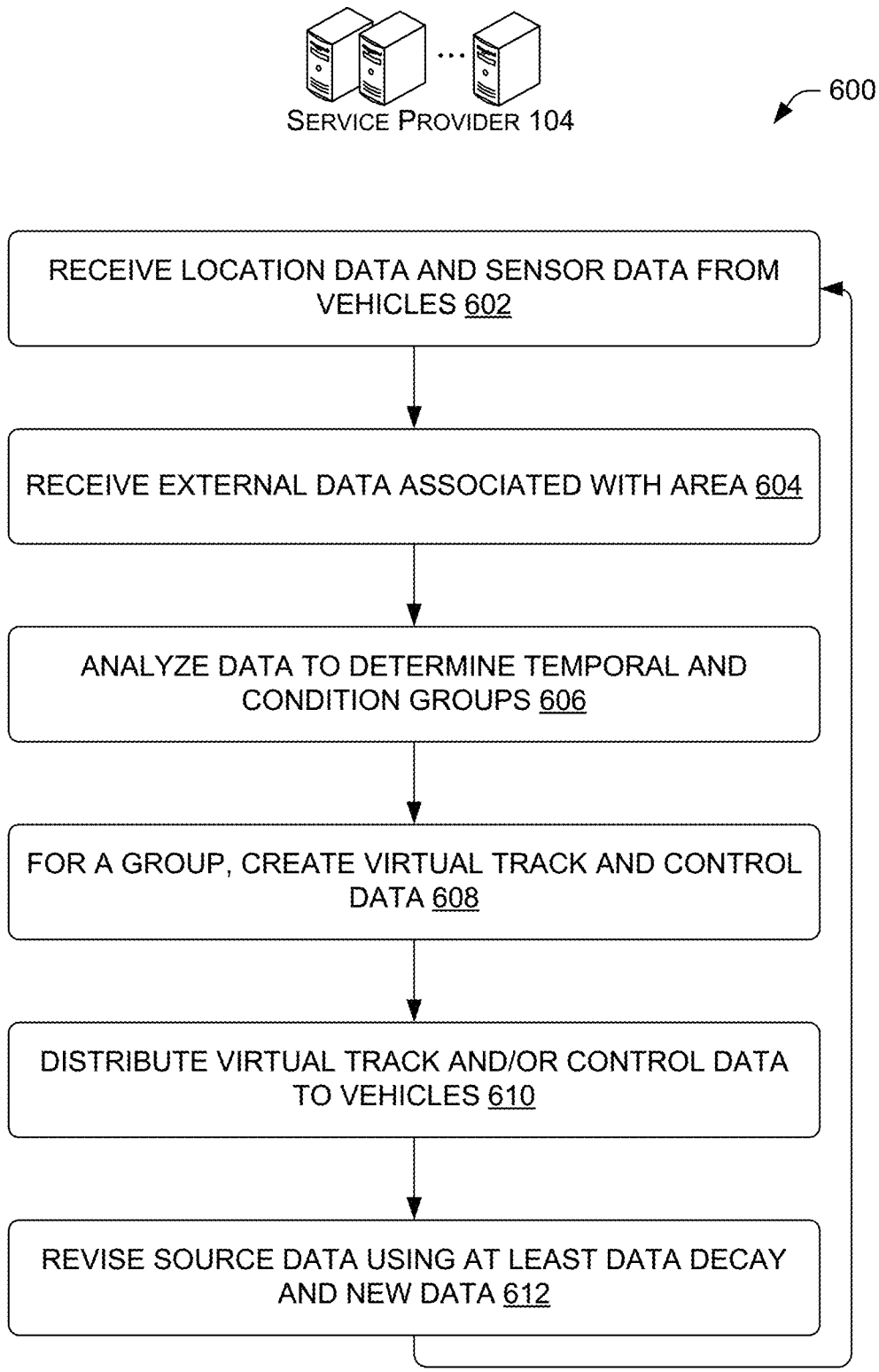
FIG. 6 is a flow diagram of an illustrative process to group and refresh annotated virtual track data.

FIG. 6 is a flow diagram of an illustrative process 600 to group and refresh annotated virtual track data. The process 600 is described with reference to the environment 100 and the computing architecture 200 and may be performed by the service provider 104.

At 602, the data collection module 206 may receive location data and other sensor data from the lead vehicle 102 and other vehicles that provide such data. The data received at the operation 502 may be the data generated at any of the operations 402-408 in the process 400 described above with reference to FIG. 4.

At 604, the data collection module 206 may receive or access external data associated with an area under analysis, such as the segment to be mapped or associated with annotated virtual track data. The external data may include weather data, terrain data, other map data (e.g., existing traditional map data, etc.), news reports, weather reports, construction notices, and so forth.

At 606, the virtual track generator 210 and/or the annotation module 212 may analyze the data from the operations 602 and/or 604 to determine temporal and/or condition grouping for the data. For example, the virtual track generator 210 may determine via the analysis that a route traveled by vehicles has significantly different average vehicle speed during different times of the day, such as during rush hour, and may determine different vehicle spacing during these times. The virtual track generator 210 may associate data with a particular weather condition to determine how vehicles operate in the segment during these different weather conditions (e.g., snow, rain, ice, fog, high wind, etc.). As another example, the direction of traffic or use of certain routes may change at different times, such as when a direction of a HOV lane changes direction during rush hour. The virtual track generator 210 may determine these changes and apply a model that uses data corresponding to the current conditions, while refraining from using data that is associated with a different condition that contradicts or is not compatible with the current condition.

At 608, the virtual track generator 210 and/or the annotation module 212 may create a virtual track and or control data for a particular group, which may be based on temporal and/or condition data as described above. The data may be created by filter data that pertains to a particular group to isolate the group and data from other groups. The resulting data may more accurately indicate a condition of travel of vehicle at the time or condition associated with the particular group. In some embodiments, the virtual track and or control data may utilize control data from a similar time/condition. For example, when a prior vehicle traveled in the similar condition at a certain speed and deployed an antilock brake mechanism and/or a traction control mechanism, that information may be used to influence control of subsequent vehicles traveling in similar conditions (e.g., cause the subsequent vehicles to slow down, use a different track, etc.). Thus, this information may be reapplied over time to "learn" from prior use of vehicle control mechanisms, such as braking mechanism and stability mechanisms.

At 610, the distribution module 218 may distribute the virtual track and/or control data to the vehicles, or otherwise make the data available to the vehicles. For example the distribution module 218 may determine a group of data that is relevant for a vehicle at a given time and/or for a given condition (e.g., weather condition, road condition, closure condition, lane use condition, etc.). The distribution module 218 may then provide that information to the vehicle. In some embodiments, a requesting vehicle may provide condition information, which may be used by the distribution module 218 to retrieve and respond with the appropriate data, such as virtual track data associated with the condition.

At 612, the data collection module 206 may revise the source data collected at the operations 602 and/or 604. The aggregation module 208 may apply a decay function to remove older data from aggregated data or to modify weights of data to cause more recent data to more highly influence resulting data drawn from the aggregated data. The aggregation module 208 may apply new data to refresh the aggregated data. The operation 612 may be performed in part by continuing the process 600 at the operation 602 as described above and progressing through the operations to the operation 610.

FIG. 7 is a flow diagram of an illustrative process 700 to identify obstacles from aggregated sensor data received from vehicle use. The process 700 is described with reference to the environment 100 and the computing architecture 200 and may be performed by the service provider 104.

702, the annotation module 212 may analyze the aggregated virtual track data provided in part by the aggregation module 208. The analysis may determine anomaly occurrences and/or other indications that are used to infer presence of obstacles and/or extract other meaningful information from the aggregated virtual track data.

At 704, the annotation module 212 may determine presence of obstacles from the aggregated virtual track data. For example, the annotation module 212 may determine that a lane of a route was previously regularly traveled by vehicles, but then has no more occurrences of vehicles in the lane for a period of time while adjacent lanes continue to include traffic. The annotation module 212 may infer that a lane includes an obstacle, such as a stalled car, road construction, debris, and/or something else that prevents vehicles from traveling through a section of the lane. In some embodiments, the annotation module 212 may determine abnormal braking patterns in an area and/or other vehicle control inputs, such as a higher than usual percentage of steering controls that cause a vehicle to change lanes. The annotation module 212 may determine the presence of an obstacle from these vehicle control inputs. For example, the obstacle may be loose animals alongside the road, which result in the braking and swerving of vehicles near the area with the loose animals.

At 706, the annotation module 212 may label the obstacles to include a description and/or name. In some embodiments, the annotation module 212 may access external data to generate a label, such as construction reports, accident reports (e.g., vehicle collision, etc.), news data, and/or other data. In various embodiments, the annotation module 212 may identify a type of obstacle based on characteristics of data, such as the amount of road closed may indicate a stalled vehicle.

At 708, the annotation module 212 may associate parameters with the obstacles. The parameters may include a duration or expected duration, vehicle control parameters to successfully navigate past the obstacles (e.g., speed control, distance information, etc.), and/or other parameter information. For example, a parameter may indicate how rough or bumpy a route is, and may provide parameters that describe or quantify the rough/bumpy route.

At 710, the annotation module 212 may associate the obstacles, labels, and parameters as annotations with the virtual track data to create annotated virtual track data for distribution, such as to provide to vehicles traveling through the segment of land, sea, or air. The annotations may be stored separate from the virtual track data or integrated with the virtual track data.

At 712, the sensor control generator 214 may generate sensor control data to enable a vehicle to monitor the obstacles within the segment. For example, the sensor control generator 214 may create data to cause a sensor to collect data from an area previously designated as having the obstacle to enable the vehicle to more quickly and more thoroughly collect data that may be used to avoid the obstacle. The sensor control generator 214 may create data to cause streamlined or more efficient analysis of data collected from sensors. In some embodiments, the sensor control generator 214 may create data to cause the sensor to monitor other objects, such as other vehicles that may react to the obstacle, such as a nearby vehicle that is likely to merge into a lane used by a vehicle deploying the data from the sensor control generator 214.

At 714, the data distribution module 218 may send the sensor control data and annotation virtual track data to one or more vehicles traveling through the segment.

Figure 8:
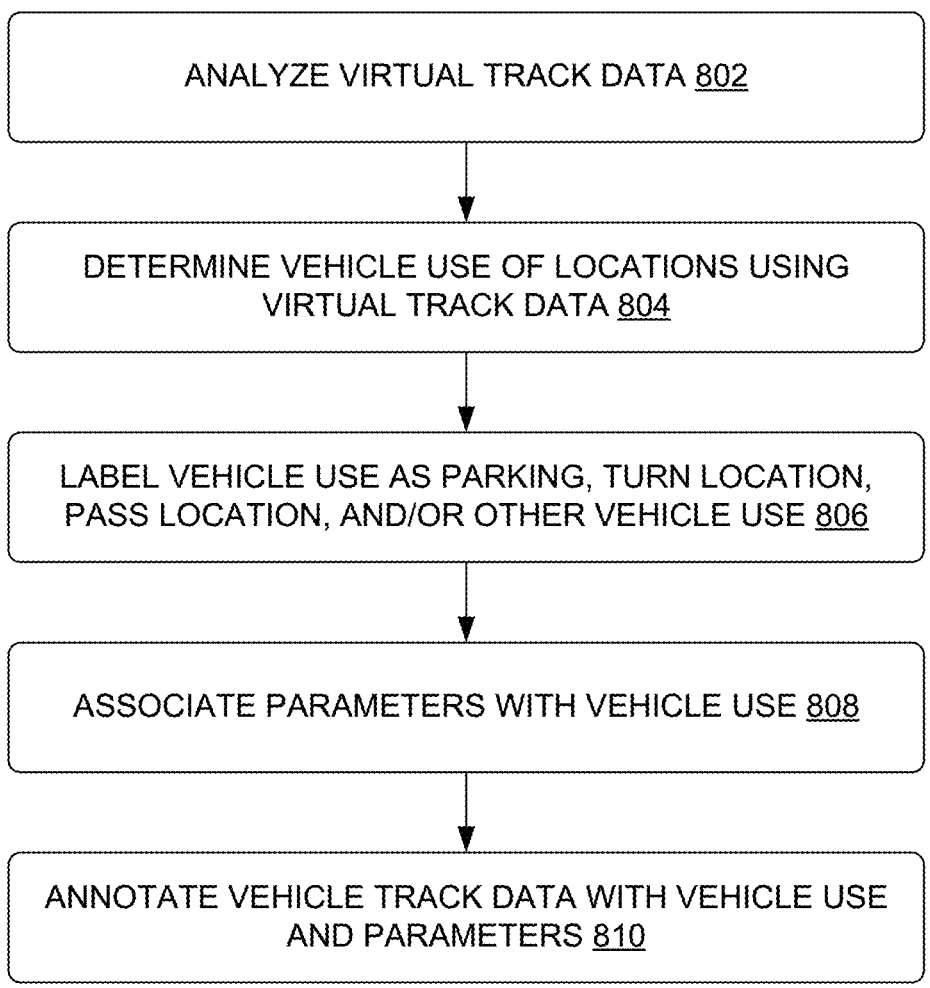
FIG. 8 is a flow diagram of an illustrative process to identify possible vehicle use from aggregated sensor data received from prior vehicle use.

FIG. 8 is a flow diagram of an illustrative process 800 to identify possible vehicle use from aggregated sensor data received from prior vehicle use. The process 800 is described with reference to the environment 100 and the computing architecture 200 and may be performed by the service provider 104.

At 802, the annotation module 212 may analyze the aggregated virtual track data provided in part by the aggregation module 208. The analysis may determine information about the segment associated with the virtual track data, such as parking locations, vehicle maneuvers, and/or other information associated with use of a vehicle in the segment.

At 804, the annotation module 212 may determine vehicle use of location using the virtual track data. The vehicle use may represent no movement of a vehicle for a period of time, which may indicate a parking location or parking space. The vehicle use may include specific maneuvers, such as a location associated with turns, a U-turn, passing in a lane having a direction of travel in the opposite direction, and/or other maneuvers.

At 806, the annotation module 212 may label the vehicle use to include a description. In some embodiments, the annotation module 212 may access external data to generate a label, such as conventional map data, vehicle control labels, and/or other data. In various embodiments, the annotation module 212 may identify a type of vehicle use based on characteristics of data, such as the amount of time and frequency that a vehicle is stationary in a location may indicate if the spot is a parking spot, as well as a type of parking spot (e.g., paid parking up to 2 hours, overnight parking, etc.).

At 808, the annotation module 212 may associate parameters with the vehicle use. The parameters may include a duration of a vehicle use, a frequency of use, and/or other parameters. For example, the parameters may indicate how long a vehicle can remain parked in a location, whether maneuvers are legal (possibly inferred from a frequency of the maneuver), whether a maneuver is illegal (possibly from determining a vehicle is pulled over by another vehicle after making the maneuver), and/or other parameter data.

At 810, the annotation module 212 may associate the vehicle use data, labels, and parameters as annotations with the virtual track data to create annotated virtual track data for distribution, such as to provide to vehicles traveling through the segment of land, sea, or air. The annotations may be stored separate from the virtual track data or integrated with the virtual track data.

Figure 9:
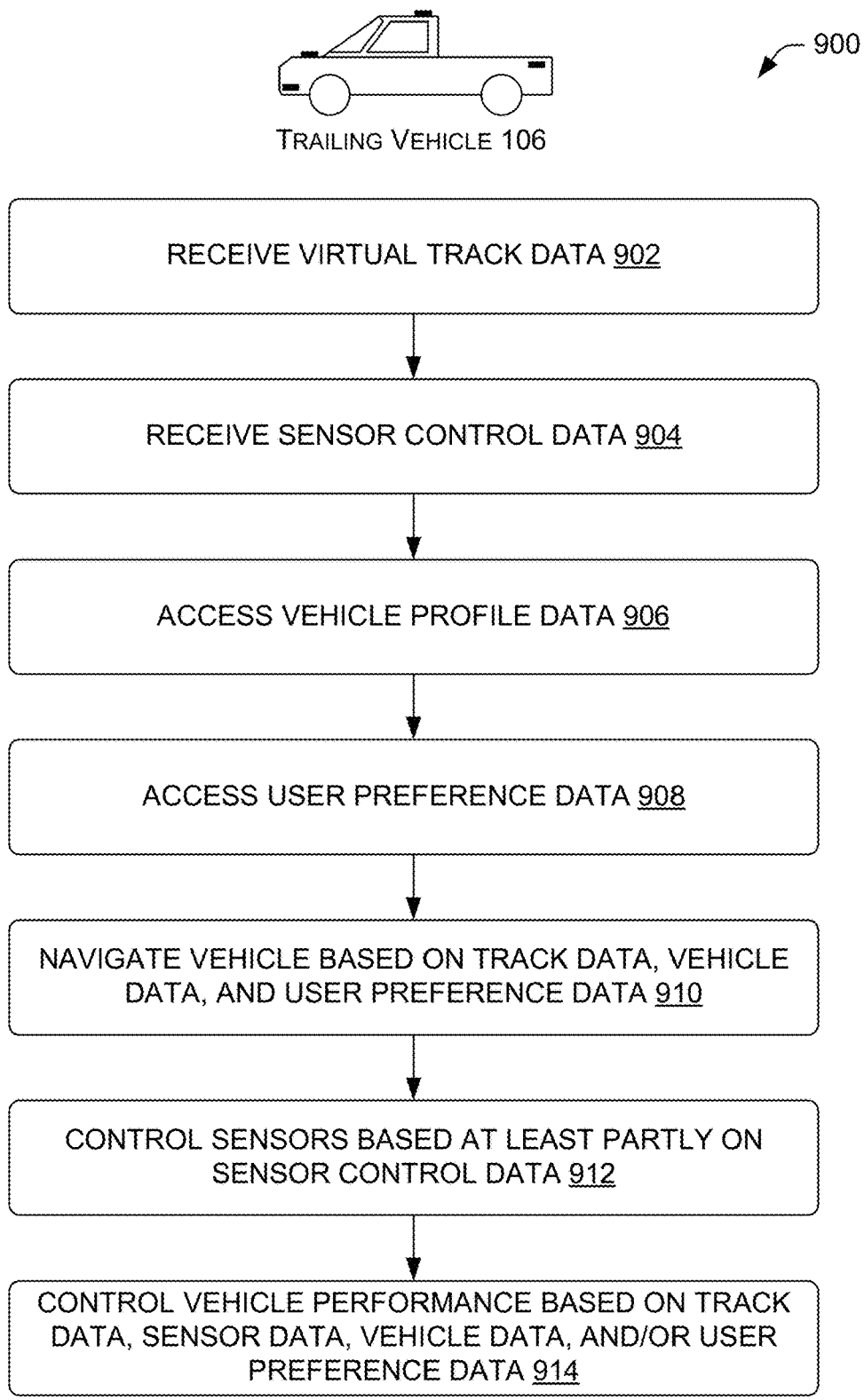
FIG. 9 is a flow diagram of an illustrative process to control a trailing vehicle using annotated virtual track data and sensor control data.

FIG. 9 is a flow diagram of an illustrative process 900 to control a trailing vehicle using annotated virtual track data and sensor control data. The process 900 is described with reference to the environment 100 and the computing architecture 300 and may be performed by a vehicle such as the trailing vehicle 106.

At 902, a vehicle, such as the trailing vehicle 106, may receive the annotated virtual track data from the service provider 104. For example, the vehicle may be entering a segment of land, sea, or air associated with particular annotated virtual track data. The vehicle may request the data, such as by sending location information to the service provider that indicates that the vehicle is likely to travel through the segment of land, sea, or air. The service provider 104 may then send the annotated virtual track data, which may be received by the vehicle and used during the traversing of the segment. For example, the annotated virtual track data may be used to augment operation of the vehicle controller 320 of the vehicle.

At 904, the vehicle may receive the sensor control data from the service provider. The sensor control data may be associated with the annotated virtual track data and may be provided in a same or similar way and/or in response to a same or similar data request.

At 906, the customization module 332 may access vehicle profile data, which may be data describes features of a vehicle, performance specifications, operational parameters, and/or other information that may influence how the vehicle is controlled by the vehicle controller 320. The vehicle profile data may be very different for an off-road vehicle than for a sports car, for example. The profile data for the off-road may specify all-wheel drive, ground clearance, acceleration capabilities, braking capabilities, and so forth. Other types of vehicles may have other information included in the vehicle profile data.

At 908, the customization module 332 may access user preference data. The user preference data may be associated with a passenger of the vehicle, which may indicate a type of ride or comfort preference by the user (e.g., slow, sport, casual, economy, minimized travel time, etc.). Other preferences may include minimize bumps, minimize braking, etc., which may be helpful if a passenger is trying to read, eat, or do work while in transit.

At 910, the navigation module 334 may navigate the vehicle, such as by determining routing information (e.g., general roads, etc.) to be used by the vehicle controller 320 to enable the vehicle to reach a destination. The navigation module 334 may receive inputs from the customization module 332 to cause the navigation in accordance with vehicle profile information and/or user preferences. For example, the vehicle profile may make permit or restrict access of the vehicle to certain roads or roads in certain conditions (e.g., in snow, in heavy rain, etc.). The user preference data may be used to select a more scenic route over a shorter, but less visually interesting route (e.g., through a tunnel, etc.).

At 912, the sensor controller 336 may control operation of sensors onboard the vehicle. The sensor controller 336 may be informed in part by sensor control data provided by the service provider 104, which may augment operation of the sensor controller 336. The sensor controller 336 may determine frequency of sampling by the sensors, directionality of the sensors (when variable), and/or other control features of the sensors. For example, the sensor controller 336 may direct a sensor to collect data in a direction of a predetermined obstacle to identify if the obstacle is present and/or to enable reaction to the obstacle or other objects (e.g., other vehicles), which may take avoidance action to avoid the obstacle, and possibly interfere with a route traveled by the vehicle.

At 914, the vehicle controller 320 may determine controls using the virtual track data and sensor data, as well as the vehicle profile information and/or the user preference information to generate customized controls parameters used to control the vehicle. For example, the virtual track information may generate a suggested speed and vehicle spacing deemed appropriate for a segment of a path traveled by other vehicles. The customization parameter may modify the speed and vehicle spacing based on the vehicle profile information and/or the user preference information, such as to slightly increase the speed and shorten the vehicle spacing distance, such as when the vehicle profile information indicates a high performance vehicle (e.g., sports car), and the user preference information indicates a preference for minimized travel time.

Figure 10:
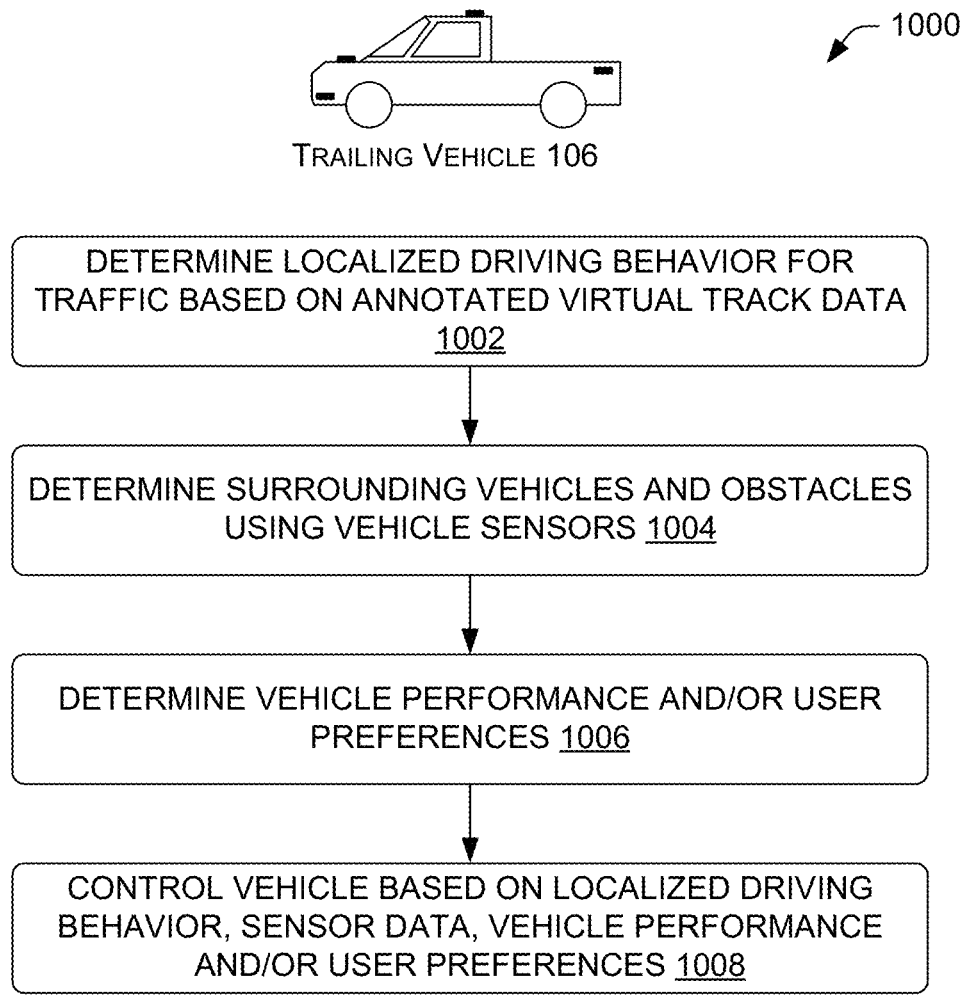
FIG. 10 is a flow diagram of an illustrative process to determine localized driving behavior from the annotated virtual track data and influence control of a vehicle using the localized driving behavior.

FIG. 10 is a flow diagram of an illustrative process 1000 to determine localized driving behavior from the annotated virtual track data and influence control of a vehicle using the localized driving behavior. The process 1000 is described with reference to the environment 100 and the computing architecture 300 and may be performed by a vehicle such as the trailing vehicle 106.

At 1002, the virtual track processor 330 may determine localized driving behavior for traffic based on the annotated virtual track data. Localized driving behaviors may be identified as driving trends common in a location, such as a town, city, or other geographic area. The localized driving behavior may be a typical spacing between vehicles used by people in an area (e.g., closer spacing in New York City than in Cheyenne, Wyoming, etc.), types of maneuvers typical in an area (e.g., right turn at red light, driving in left most lane, using shoulder as turn lane, etc.). The vehicle spacing may be a minimum acceptable distance between vehicles along the segment, such as using standard deviation data and/or other statistical data. The localized driving behaviors may be determined and stored as parameters, which may be used to influence control of the trailing vehicle 106.

At 1004, the virtual track processor 330 and sensor controller 226 may determine surrounding vehicles and obstacles using the vehicle sensors 1104. The sensors of the vehicle may be augmented using sensor control data to obtain information about the obstacles or due to presence of the obstacles.

At 1006, the customization module 332 may determine vehicle performance, via the vehicle profile data, and/or user preferences, via the user preference data. The vehicle performance and user preference data may be used to determine the vehicle spacing and/or other controls of the vehicle by the vehicle controller 320. For example, some users may be more or less comfortable with a vehicle being spaced closely to another vehicle while the vehicles travel at certain speeds.

At 1008, the vehicle controller 320 may control a particular vehicle based on the localized driving behavior, vehicle performance data, and/or user preferences. For example, the vehicle controller 320 may increase determined localized vehicle spacing when the performance data indicates that the vehicle has certain reduced braking ability, the user preference is not to be close to other vehicles.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   receiving virtual track data for a virtual track, the virtual track data comprising sensor control data for use by an autonomous vehicle traversing a segment of land associated with the virtual track, the sensor control data based at least in part on first sensor data collected by a previous vehicle traversing the segment of land and annotated to the virtual track by the previous vehicle;
   receiving at least one of vehicle capability data or user preference data associated with the autonomous vehicle;
   navigating the autonomous vehicle based at least in part on the virtual track data and the at least one of the vehicle capability data or the user preference data;
   causing one or more sensors associated with the autonomous vehicle to obtain second sensor data based at least in part on the sensor control data; and
   controlling the autonomous vehicle based at least in part on the second sensor data.

2. The method of claim 1, wherein:
   the method further comprises identifying, based at least in part on the virtual track data, a location of an obstacle on the segment of land; and
   navigating the autonomous vehicle is further based at least in part on the location of the obstacle.

3. The method of claim 1, further comprising:
   identifying, based at least in part on the second sensor data, a location of an obstacle on the segment of land; and
   updating the virtual track data based at least in part on the location of the obstacle.

4. The method of claim 3, wherein causing the one or more sensors to obtain the second sensor data comprises causing the one or more sensors to obtain the second sensor data at the location of the obstacle.

5. The method of claim 3, wherein updating the virtual track data comprises:
   generating one or more sensor controls for causing third sensor data to be collected by a second vehicle traversing the segment of land, the one or more sensor controls associated with the location of the obstacle; and
   updating the virtual track data based at least in part on the one or more sensor controls.

6. A system comprising:
   one or more processors; and
   memory to store one or more computer-executable instructions that, when executed, cause the one or more processors to execute operations comprising:
      determining virtual track data for a virtual track, the virtual track data based at least in part on one or more vehicles traversing a segment of land associated with the virtual track;
      determining vehicle capability data associated with an autonomous vehicle;
      navigating the autonomous vehicle based at least in part on the virtual track data and the vehicle capability data;
      causing one or more sensors associated with the autonomous vehicle to obtain first sensor data based at least in part on control data annotated to the virtual track by a previous vehicle traversing the segment of land, wherein the control data is based at least in part on second sensor data collected by the previous vehicle; and
      controlling the autonomous vehicle based at least in part on the first sensor data.

7. The system of claim 6, wherein controlling the autonomous vehicle is further based at least in part on one or more of:
   the control data;
   the vehicle capability data; or
   user preference data associated with the autonomous vehicle.

8. The system of claim 6, wherein navigating the autonomous vehicle comprises:
   determining a road condition associated with a route; and
   navigating the autonomous vehicle along the route based at least in part on the road condition and the vehicle capability data.

9. The system of claim 6, wherein controlling the autonomous vehicle comprises:
   determining one or more vehicle control parameters based at least in part on the virtual track data;
   modifying the one or more vehicle control parameters based at least in part on the vehicle capability data to generate one or more modified vehicle control parameters; and
   controlling the autonomous vehicle based at least in part on the one or more modified vehicle control parameters.

10. The system of claim 9, wherein the one or more modified vehicle control parameters comprise one or more of:
- vehicle speed;
- vehicle spacing;
- vehicle acceleration; or
- vehicle deceleration.

11. The system of claim 9, wherein the operations further comprise:
- determining vehicle control data based at least in part on controlling the autonomous vehicle based at least in part on the one or more modified vehicle control parameters;
- determining annotated virtual track data based at least in part on the vehicle control data; and
- updating the virtual track data based at least in part on the annotated virtual track data.

12. The system of claim 11, wherein updating the virtual track data comprises transmitting the annotated virtual track data to one or more other vehicles.

13. The system of claim 6, wherein the operations further comprise:
- generating one or more sensor controls for causing third sensor data to be collected by a second vehicle traversing the segment of land, the one or more sensor controls based at least in part on the third sensor data; and
- updating the virtual track data based at least in part on the one or more sensor controls.

14. A method comprising:
- determining user preference data associated with an autonomous vehicle;
- requesting virtual track data based at least in part on one or more vehicles traversing a segment of land; and
- in response to receiving the virtual track data:
  - navigating the autonomous vehicle based at least in part on the virtual track data and the user preference data;
  - causing one or more sensors associated with the autonomous vehicle to obtain first sensor data based at least in part on control data annotated to the virtual track data by a previous vehicle traversing the segment of land, wherein the control data is based at least in part on second sensor data collected by the previous vehicle; and
  - controlling the autonomous vehicle based at least in part on the virtual track data.

15. The method of claim 14, wherein controlling the autonomous vehicle is further based at least in part on one or more of:
- the control data;
- the user preference data; or
- vehicle capability data associated with the autonomous vehicle.

16. The method of claim 14, wherein navigating the autonomous vehicle comprises:
- determining a road condition associated with a route; and
- navigating the autonomous vehicle along the route based at least in part on the road condition and the user preference data.

17. The method of claim 14, wherein controlling the autonomous vehicle comprises:
- determining one or more vehicle control parameters based at least in part on the virtual track data;
- modifying the one or more vehicle control parameters based at least in part on the user preference data to generate one or more modified vehicle control parameters; and
- controlling the autonomous vehicle based at least in part on the one or more modified vehicle control parameters.

18. The method of claim 17, wherein the one or more modified vehicle control parameters comprise one or more of:
- vehicle speed;
- vehicle spacing;
- vehicle acceleration; or
- vehicle deceleration.

19. The method of claim 17, further comprising:
- determining vehicle control data based at least in part on controlling the autonomous vehicle based at least in part on the one or more modified vehicle control parameters;
- determining annotated virtual track data based at least in part on the vehicle control data; and
- updating the virtual track data based at least in part on the annotated virtual track data.

20. The method of claim 19, wherein updating the virtual track data comprises transmitting the annotated virtual track data to one or more other vehicles.

* * * * *